Feb. 24, 1953 R. L. TRENT 2,629,834

GATE AND TRIGGER CIRCUITS EMPLOYING TRANSISTORS

Filed Sept. 15, 1951 2 SHEETS--SHEET 1

INVENTOR
R. L. TRENT
BY H. A. Burgess
ATTORNEY

INVENTOR
R. L. TRENT
BY H. A. Burgess
ATTORNEY

Patented Feb. 24, 1953 2,629,834

UNITED STATES PATENT OFFICE 2,629,834

GATE AND TRIGGER CIRCUITS EMPLOYING TRANSISTORS

Robert L. Trent, Far Hills, N. J., assignor to Bell Telephone Laboratories, Incorporated, New York, N. Y., a corporation of New York Application September 15, 1951, Serial No. 246,832

11 Claims. (Cl. 307—88)

This invention relates to gate and trigger type circuits which employ transistors.

The circuits of the present invention employ as their central elements translating devices which have been come to be known as transistors. Transistors are disclosed, for example, in Patent 2,524,035, dated October 3, 1950, to John Bardeen and Walter H. Brattain. Transistors of the type disclosed in this patent comprise a body of semiconductive material such as germanium, with which a pair of electrodes known as the emitter and collector electrodes make point contact and with which a third electrode known as the base electrode makes a low resistance ohmic contact. Electrode currents are deemed positive if they flow from the electrode into the semiconductive body. If the semiconductive material is n-type, and amplification is desired, the emitter electrode is normally biased in the forward direction by a small positive voltage, while a large negative bias is applied to the collector electrode to bias it in the backward direction. A small positive current applied to the emitter electrode will then result in a negative current in the collector electrode which generally will exceed the emitter electrode in magnitude. This current multiplication exists in most transistors of this type. If the semiconductive body is of p-type material, the normal directions of electrode current flow and the poling of the biasing batteries are reversed. The transistors employed in the present description will be assumed to be n-type, although the invention itself contemplates p-type transistors as well as other known types.

If a resistor of the order of 10,000 ohms is connected in series with the base electrode, the transistor will have negative resistance properties. This has been disclosed in a copending application of A. J. Rack, Serial No. 79,861, filed March 5, 1949, and may be understood by considering the directions of electrode current flow and the current multiplication properities of the transistor. The base current is the algebraic sum of the emitter and collector currents, and since the collector current is normally negative and larger in magnitude than the emitter current, the normal base current for positive emitter currents will be positive. Therefore, a positive emitter current will result in a larger positive base current, which, by flowing through the large base resistance, makes the base more negative with respect to the emitter, so that the emitter current will be increassed, inducing an even larger positive base current. It is this regenerative feedback which gives rise to the negative resistance characteristics. A typical emitter current-voltage characteristic has a region of negative slope bounded on either side by regions of positive slope with which it is continuous.

In accordance with an illustrative embodiment of the invention to be described in detail below, the load line of a transistor trigger circuit is proportioned so that it intersects the emitter current-voltage characteristic only in the negative emitter current positive resistance region. With such a load line, the trigger circuit is monostable. In one embodiment, a source of pulses of relatively long duration varies the emitter bias between two values, both negative, neither of which is sufficient to trigger the circuit. Relatively short positive pulses applied to the emitter electrode will be gated and regenerated only when the emitter bias has the less negative of its two values. The output pulses will be related to the input pulses only in time and will be of a uniform amplitude and wave shape, thus providing regeneration if the amplitude of the short input pulses is sufficient to trigger the circuit.

In another embodiment, pulses of comparable duration from two sources are applied to the emitter electrode in a parallel manner. A pulse from either source alone will not trigger the circuit due to a negative bias which is also applied to the emitter electrode. An output pulse will be produced, however, if the two signal pulses coincide in time; this circuit is, therefore, a coincidence or AND circuit. A BUT NOT circuit may be attained by reversing the polarity of one of the trains of input pulses and by reducing the fixed bias on the emitter electrode to a value such that a positive pulse will trigger the circuit if a negative pulse is not simultaneously applied to the emitter.

An object of the invention is a regenerative pulse amplifier.

Another object of the invention is a transistor coincidence circuit having high input impedance.

Another object of the invention is to gate and regenerate an input pulse without unduly loading the gate control source.

Another object of the invention is a transistor coincidence circuit having BUT NOT properties.

Other objects of the invention, together with its several features, may be better understood from a consideration of the following detailed description when read in accordance with the attached drawings, in which.

Figure 7:
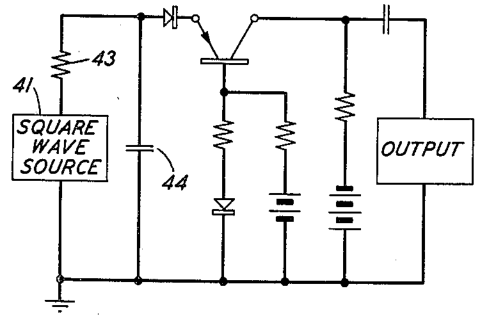
Figure 8:
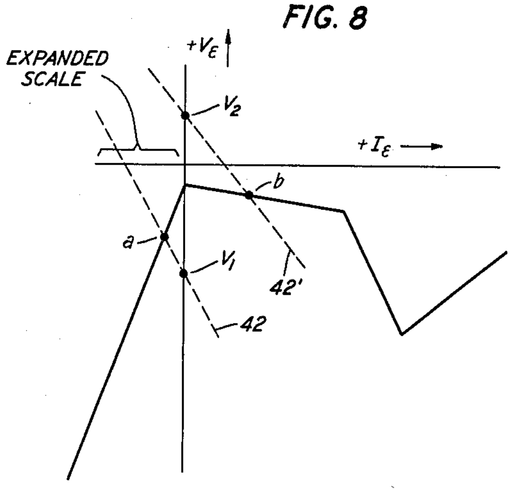
Figure 9:
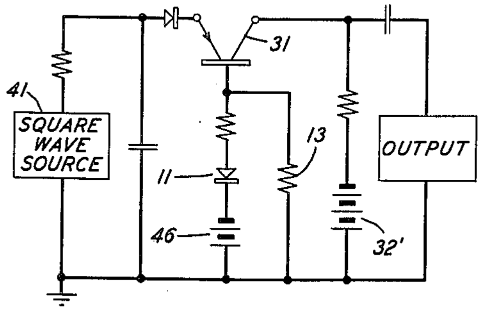
Figure 10:
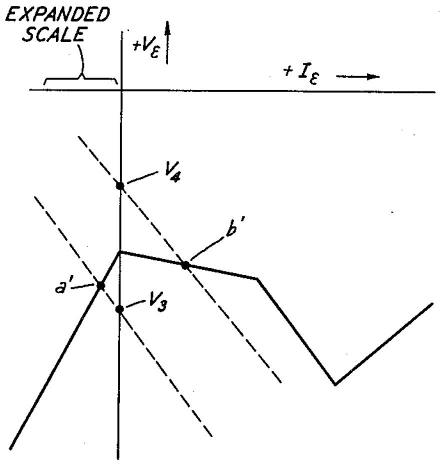

Figs. 7 and 9 illustrate a start-stop pulse generator employing principles of the present invention; and Figs. 8 and 10 are circuit characteristics explanatory of the circuits of Figs. 7 and 9, respectively.

Figure 1:
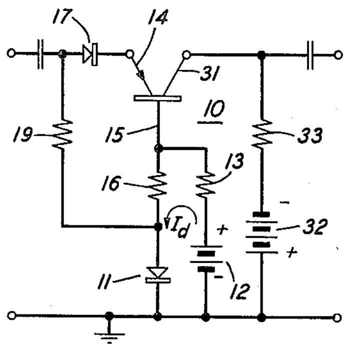
Fig. 1 is a schematic diagram of an illustrative stabilized transistor trigger circuit.
Figure 2:
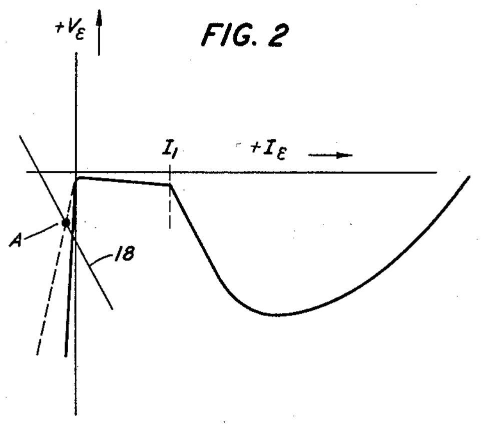
Fig. 2 illustrates the emitter current-voltage characteristic of the circuit of Fig. 1.

The basic regenerative amplifier circuit employing a transistor 10 of the type described above is illustrated in Fig. 1, and a typical input, i. e., emitter, characteristic is shown in Fig. 2. This circuit includes a base stabilization diode 11 which may, for example, be a germanium crystal rectifier biased by a battery 12 through the resistor 13, as described in a copending application of A. J. Rack, Serial No. 185,041, filed September 15, 1950, which issued as Patent 2,579,336 on December 18, 1951. The emitter electrode 14 is biased negatively with respect to the base electrode 15 by the voltage drop across the resistor 16 which is connected in series with the base electrode 15 and the stabilizing diode 11. The collector electrode 31 is biased negatively by the battery 32 and the current-limiting resistor 33. As long as the emitter current is negative, the collector current will be small, and the biasing current $I_d$ holds the base diode 11 in its low resistance or forward direction. The biasing current $I_d$ may be adjusted to be equal and opposite to the base current at zero emitter current. For positive emitter currents, the biasing current $I_d$ will be overcome by the larger positive base current, and the base diode 11 will switch to its high resistance condition and insert the necessary regenerative feedback to promote instability. The biasing current $I_d$ may alternatively be adjusted to be larger and opposite to the base current obtained at zero emitter current for an average acceptable transistor. This will permit the interchangeable use of transistors having wide initial variations in base current at zero emitter current.

The use of a biased diode as a switch to provide a two-valued feedback element instead of an ohmic resistor permits clamping the turning point at approximately zero emitter voltage. If an ohmic resistor were used instead, wide variations in the turning point might result from variations in base electrode current at zero or negative emitter currents which have been found to arise both from temperature variations and variations from unit to unit.

The resistor 16 has a value which is mall relative to that of resistor 13 and is just large enough to insure instability in the positive emitter current region in the event that variations in the base electrode current should prevent the base diode 11 from switching to its high resistance position at zero emitter current. This resistor 16 determines the negative slope in Fig. 2 between $I_e=0$ and $I_e=I$, the latter current being that value of emitter current at which the base diode 11 becomes a high resistance, causing the base current to flow through resistor 13. The use of a resistor such as resistor 16 is more fully described in a copending application of mine, Serial No. 223,522, filed April 28, 1951.

The diode 17 in series with the emitter electrode and poled in the direction of positive emitter current enhances the high backward resistance of the emitter contact in the negative emitter current region, thereby increasing the slope of the characteristic in the negative emitter current region to provide additional discrimination. The dashed portion of the characteristic in Fig. 2 illustrates the slope with no series emitter diode 17.

The load line 18 has a slope determined primarily by the value of the resistor 19. Negative bias is applied to the emitter electrode by the voltage drop across resistor 16. The intersection of the load line 18 with this characteristic at "A" indicates the stable operating point for the circuit. Since it intersects the characteristic only in one region of positive slope, the circuit is monostable. If the emitter voltage were increased beyond the triggering point indicated by the turning point of the characteristic at zero emitter current, the circuit would proceed rapidly through the negative resistance region and into the positive emitter current positive resistance region. Since there is no stable operating point in this region, it will return to its equilibrium point represented by the intersection "A."

Figure 3:
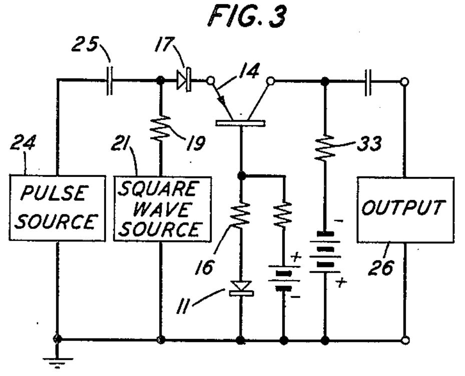
Figs. 3 and 5 illustrate gating and triggering circuits employing principles of the present invention.

Fig. 3 illustrates a circuit embodying principles of the present invention and employing the basic regenerative amplifier described in connection with Fig. 1. This circuit is capable of performing the function of AND gating with two pulse inputs, the pulses from one of the sources having durations which are long relative to the others. The longer-duration pulse train will be denominated a "square wave" and the other train merely "pulses," although both waves are actually pulse trains and may both be square waves. The square wave provided by the source 21 is direct current in nature and varies between two predetermined values. In the circuit configuration of Fig. 3, the square wave provides the emitter bias so that a connection of the load-line resistor 19 to the junction of the resistor 16 and the base diode 11, as in Fig. 1, is unnecessary.

Figure 4:
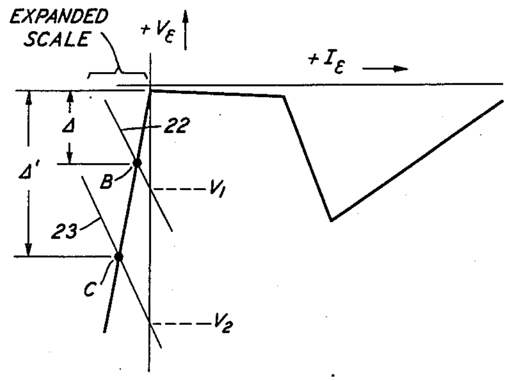
Figs. 4 and 6 illustrate the emitter current-voltage characteristics of the circuits of Figs. 3 and 5, respectively.

The emitter characteristic for the circuit configuration of Fig. 3 is shown in Fig. 4. This characteristic has been idealized by substituting straight-line approximations for the characteristic as shown in Fig. 2. Furthermore, the negative emitter current region is plotted on an expanded scale to better illustrate the characteristic in this region.

The output of the square wave source 21 varies the emitter bias between two negative values, $V_1$ and $V_2$. The two load-line characteristics 22 and 23 determined by the load-line resistor 19 and the voltages $V_1$ and $V_2$ are superimposed on the characteristic in Fig. 4. These result in two stable operating points designated B and C, respectively. When the output of the step voltage source is such that the circuit is stable at operating point B, an input pulse voltage $\Delta$ is required to trigger the circuit. If a pulse of at least this amplitude is supplied by the pulse source 24 through the input condenser 25 when the circuit is in this condition, the circuit will be triggered; and a positive output pulse will be delivered to the load 26. The pulse from the source 24 which is gated by the circuit to the load 26 will be regenerated, which means that it will be both amplified and modified as to wave shape and pulse duration. The pulses supplied by the pulse source 24 are assumed to have an amplitude intermediate between $\Delta$ and $\Delta'$ so that if the circuit is stable at operating point C, as determined by the source 21, input pulses from source 24 will not trigger the circuit, and no output pulse will be obtained.

The circuit of Fig. 3 is characterized by a high input impedance to the square wave source 21 which may comprise, for example, a bistable multivibrator. When the circuit is stable in the negative emitter current region, the square wave source 21 sees an input impedance which includes the sum of the load-line resistor 19, the high backward resistance of the emitter diode 17, and the high backward resistance of the emitter contact 14. When the circuit is triggered into the positive emitter current region, the source 21 continues to see at least the resistance of the resistor 19 which is purposely made large. This feature permits many of these gated amplifiers to be operated in parallel by the same low impedance square wave source.

The pulse source 24 also sees a high impedance, the backward resistances of the diode 17, and the emitter contact in parallel with the load resistor 19 except during a triggering interval when both the diode 17 and emitter electrode 14 are biased in their forward directions.

Figure 5:
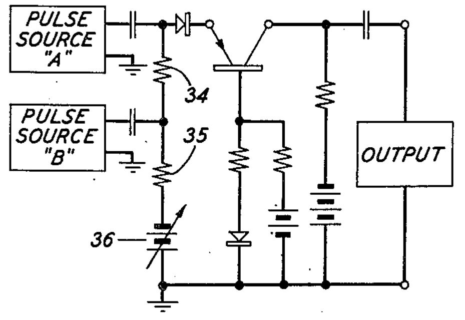
Figure 6:
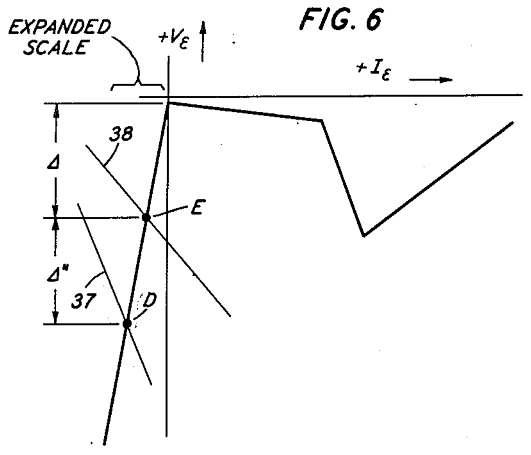

The circuit illustrated in Fig. 5 will perform the function of AND gating, using two coincident positive pulses of comparable duration which are supplied by pulse sources "A" and "B." The load-line resistor is divided into a potentiometer having two resistance arms 34 and 35. This potentiometer is connected to a source 36 of negative biasing potential which establishes a direct-current equilibrium point in the absence of input pulses at D, as shown in Fig. 6. This bias is adjusted to be sufficiently negative so that neither the pulses from the source A nor those from the source B have a sufficient amplitude to trigger the circuit. A coincidence of pulses from sources A and B, however, will trigger the circuit and deliver a standard pulse to the load circuit. The load line 37 intersecting the characteristic at D has a slope determined by both resistors 34 and 35, while the load line 38 intersecting the characteristic at E includes only the resistor 34. Input pulse amplitude limitations for use in this circuit are more stringent than with the circuit of Fig. 3 and must be controlled so that the pulses produced by either the source A or B are not sufficient to trigger the circuit. Amplitude-limiting features may be included in the outputs of the pulse sources "A" and "B" to meet this requirement.

The switching function BUT NOT gating may be accomplished by the gate shown in Fig. 5 if one of the sources A and B produces positive-going pulses and the other source produces negative-going pulses and if the bias supplied by the battery 36 is decreased to provide an equilibrium point in the absence of input pulses at E. When the circuit is stable at point E, a positive pulse, for example, produced by the source A, will trigger the circuit and delivers a positive pulse to the output but not if a negative pulse is simultaneously impressed on the input by source B. This may be seen by referring to the characteristic and load lines shown in Fig. 6, wherein it is assumed that the pulses produced by one of the sources have an amplitude $\Delta$ and those of the other source have an amplitude $\Delta''$, where the latter pulses are negative-going. By similar reasoning, the square wave source in Fig. 3 could be a negative step function so that this circuit could also be adapted to provide BUT NOT gating. The switching function of OR gating will be provided if the circuit in Fig. 5 is biased to be quiescent at point E and if the pulses from both sources "A" and "B" are positive and each of amplitude of at least $\Delta$. A pulse will then be delivered to the output if a pulse is applied by either source "A" or source "B."

The circuit shown in Fig. 7 operates as a start-stop pulse generator. The square wave source 41 is merely illustrative of means to shift the load line 42, Fig. 8, between two values. When the load line intersects the characteristic at $a$, the circuit is stable. This load line is characterized by an emitter voltage at zero emitter current of $V_1$ and is therefore realized when the square wave source 41 produces, at its output, the more negative of its two output voltages. When the source 41 produces its more positive voltage so as to bias the emitter at $V_2$ at zero emitter current, the load line is raised and intersects the emitter characteristic at $b$. Since this latter intersection is in the negative slope region, the circuit will now be astable and give forth a train of output pulses, much in the manner as is more fully described in a copending application of A. E. Anderson, Serial No. 166,733, filed June 7, 1950. The periodicity of these pulses is determined primarily by the RC network comprising resistor 43 and capacitor 44 but also by the biasing point $V_2$. This train of pulses will continue until the source 41 returns the bias point to $V_1$. The source 41 could alternatively comprise, for example, a manually operated relay which in turn could be controlled either locally or remotely.

The circuit shown in Fig. 7 requires both a positive and a negative control voltage. The entire emitter characteristic may be shifted negatively, as shown in Fig. 10, by the circuit modifications shown in Fig. 9 so that control may be effected by voltages which are both negative. These modifications comprise returning the cathode of the diode 11 to a negative potential determined by the battery 46, proportionally lowering the potential of the lower terminal of the resistor 13 to a potential which may be ground, as shown, or any other suitable potential, and by also increasing the negative voltage supplied to the collector 31 by the collector supply battery 32'. Since the feedback resistance in the positive emitter current region is determined primarily by the value of resistor 13, the stability of the circuit as a whole is enhanced by returning this resistor directly to ground and properly proportioning the voltages of batteries 46 and 32', since spurious feedback resistances which may be inserted by a potential source in this branch are thereby eliminated. The circuit of Fig. 9 will be quiescent when the source 41' fixes the load line at a zero emitter current voltage of $V_3$ and will produce a train of pulses when the bias point is raised to $V_4$.

Although the invention has been described as relating to specific embodiments, numerous other embodiments and modifications will readily appear to one skilled in the art without departing from the scope of the invention. For example, the invention should not be deemed to be limited to the use of point contact transistors as described above, since it is also applicable to other types of transistors such as those of the junction type (e. g., n-p-n, p-n-p, p-n, etc.).

What is claimed is:

1. The combination which comprises a trigger circuit, said trigger circuit comprising a transistor having an emitter electrode, a collector electrode, and a base electrode, a first external circuit interconnecting said emitter and base electrodes, a second external circuit interconnecting said collector and base electrodes, means to promote sufficient regenerative feedback from said second circuit to said first circuit to give rise to a region of negative resistance in the current-voltage characteristics of said first circuit, a first and a second source of pulses, and means to apply the pulses from said sources to said emitter electrode in a parallel manner.

2. The combination in accordance with claim 1, wherein the pulses of one of said sources have durations which are long relative to the durations of the pulses from the other of said sources.

3. The combination in accordance with claim 1 of means to render said trigger circuit monostable and wherein the pulses from neither of said sources have an amplitude sufficient to trigger said trigger circuit.

4. The combination in accordance with claim 1, wherein the pulses from one of said sources are positive-going and the pulses from the other of said sources are negative-going and where said positive-going pulses have an amplitude which is sufficient in the absence of said negative-going pulses to trigger said circuit.

5. The combination in accordance with claim 1 of an asymmetrically conducting impedance element connected in series with said emitter electrode and poled in the direction of positive emitter current flow.

6. A gating circuit which comprises a trigger circuit, said trigger circuit comprising a transistor having an emitter electrode, a collector electrode, and a base electrode, means to render said transistor unstable over at least a range of emitter currents and an impedance element connected in a shunt relation with said emitter and base electrodes and proportioned to give said trigger circuit a stable operating point, a first and a second source of voltage, each varying between two values, means to connect each of said sources to said emitter electrode, the two values of one of said voltages and at least one value of the other of said voltages being insufficient alone to trigger said trigger circuit and an output circuit connected to said collector electrode.

7. A gating circuit which comprises a transistor trigger circuit having at least one stable operating point, said trigger circuit comprising a transistor having an emitter electrode, a collector electrode, and a base electrode, a pair of external circuits each including a source of potential interconnecting said electrodes, means to provide sufficient regenerative current feedback from said collector electrode to said emitter electrode to give rise to a negative resistance region in the emitter current-emitter voltage characteristic of said transistor, a first source of potential connected to said emitter electrode which varies between two values neither of which are sufficient to trigger said trigger circuit, and a second source of potential also connected to said emitter electrode which varies between two values of voltage, one of which is insufficient alone to trigger said trigger circuit.

8. A coincidence circuit which comprises a transistor trigger circuit, said trigger circuit comprising a transistor having an emitter electrode, a collector electrode, and a base electrode, feedback promoting means to render said trigger circuit unstable over at least a range of emitter currents, and a load-line resistor connected in a shunt relation with said emitter and base electrode and proportioned to make said trigger circuit monostable, a source of voltage which varies between two values neither of which is sufficient to trigger said trigger circuit connected in series with said load-line resistor, a source of pulses which have an amplitude sufficient to trigger said trigger circuit only when said voltage has a predetermined one of its two values, means to apply said pulses to said emitter electrode, and an output circuit connected to said collector electrode.

9. A gating circuit which comprises a trigger circuit, said trigger circuit comprising a transistor having an emitter electrode, a collector electrode, and a base electrode, an impedance element connected to said base electrode and proportioned to give said transistor the characteristic of a negative resistance over a portion of its operating range and a load-line impedance element connected in a shunt relationship with said emitter and base electrodes and proportioned to render said trigger circuit monostable, a first source of voltage which varies between two values neither of which is sufficient to trigger said trigger circuit, a second source of voltage which varies between two values neither of which is sufficient to trigger said trigger circuit, the voltages of each of said sources each having one value and one value only which, when added to the said one voltage of the other of said sources, is sufficient to trigger said trigger circuit, means connecting each of said sources to said emitter electrode, and an output circuit connected to said collector electrode.

10. The combination which comprises a transistor having an emitter electrode, a collector electrode, and a base electrode, a first external circuit interconnecting said emitter and base electrodes, a second external circuit interconnecting said collector and base electrodes, means to promote sufficient feedback from said second circuit to said first circuit over at least a range of emitter currents to give the emitter current-voltage characteristic of said transistor a negative resistance region bounded by two positive resistance regions, a load-line resistor and a source of potential connected in said first circuit, and means to vary the voltage of said source between a first value which locates the intersection of the load line and said characteristic in one of said positive resistance regions, and a second value which locates said intersection in said negative resistance region.

11. The combination in accordance with claim 10, and a capacitor connected in parallel with said source and said load-line resistor.

ROBERT L. TRENT.

No references cited.